T. J. SARASIN, A. FOURNIER & H. SARASIN.
AUTOMOBILE TRUCK.
APPLICATION FILED NOV. 12, 1917.
1,281,847.
Patented Oct. 15, 1918.
4 SHEETS—SHEET 1.
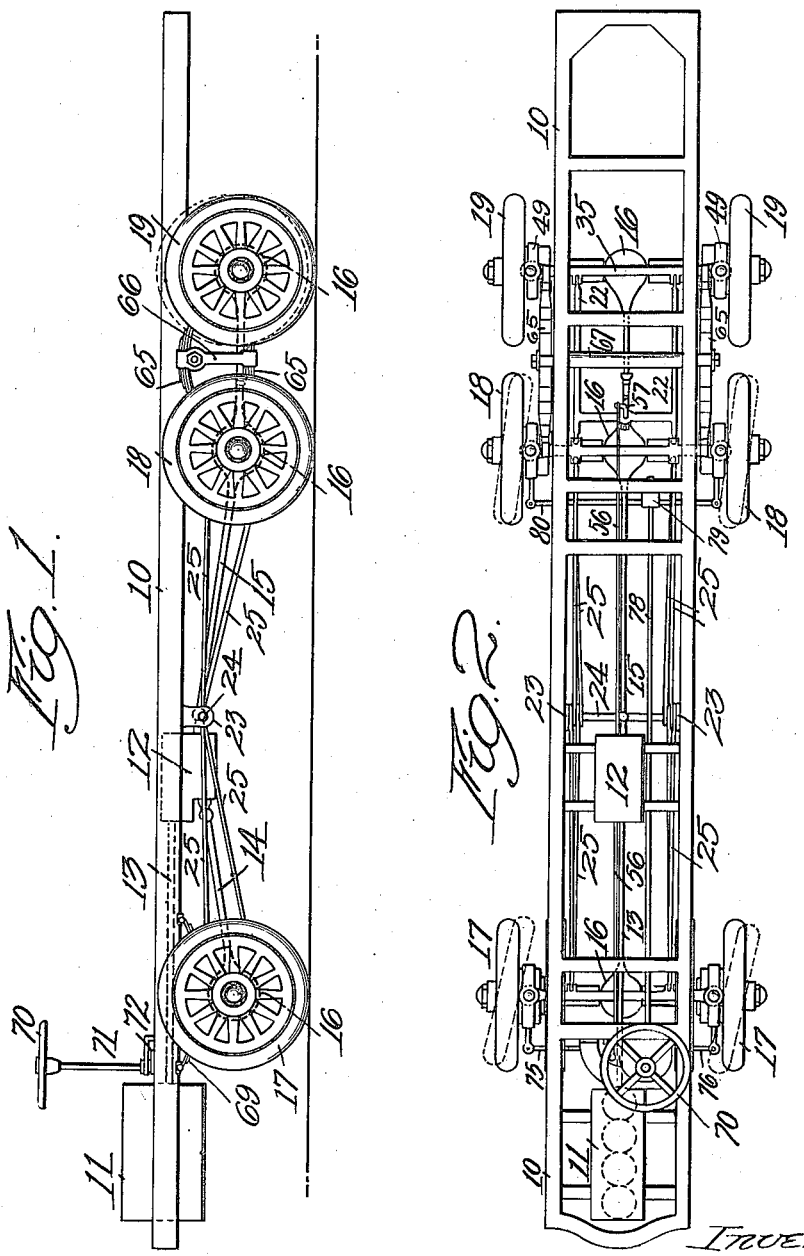

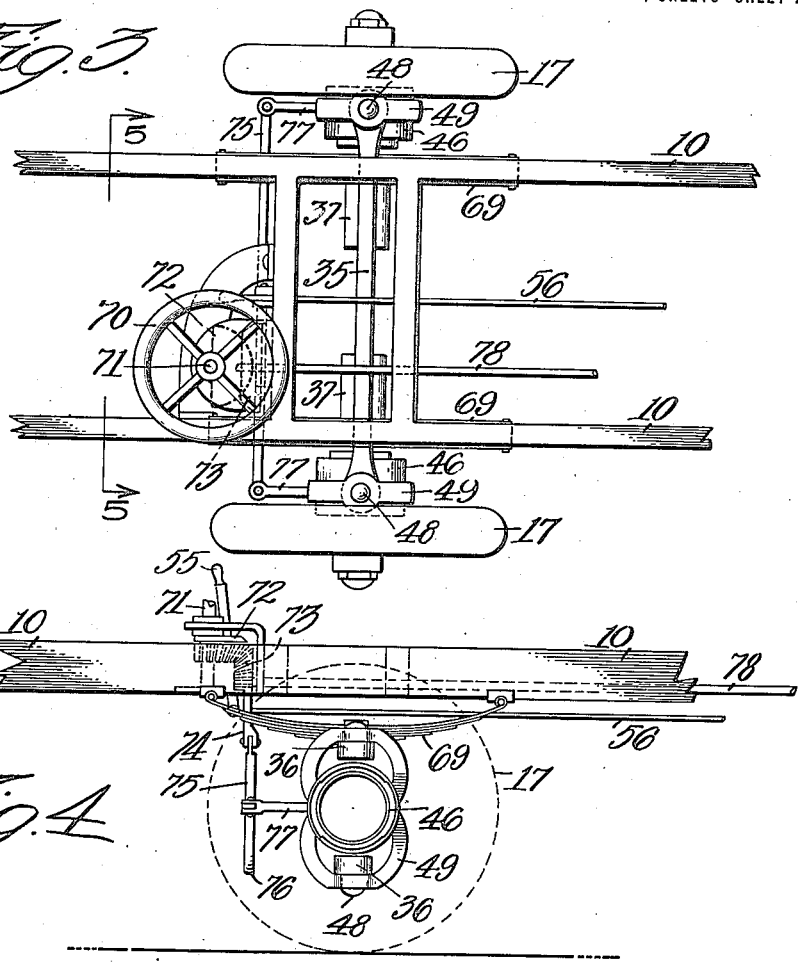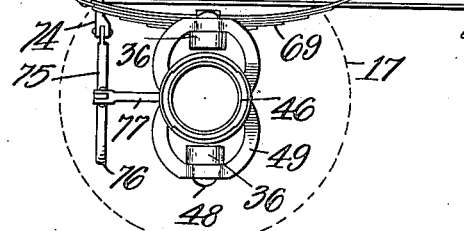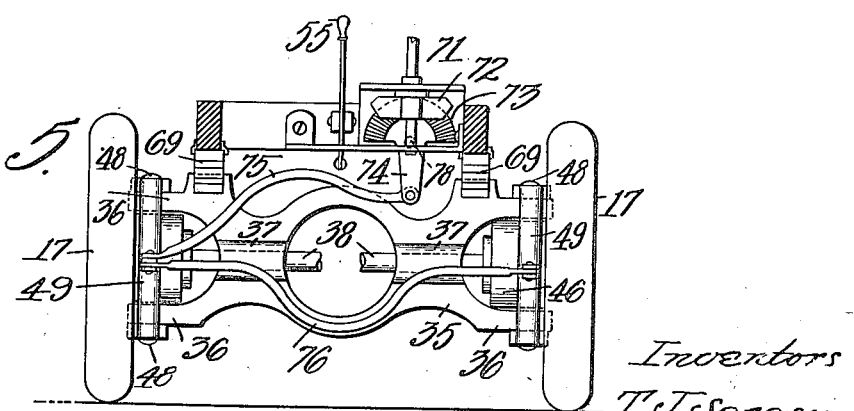

T. J. SARASIN, A. FOURNIER & H. SARASIN.
AUTOMOBILE TRUCK.
APPLICATION FILED NOV. 12, 1917.
1,281,847.
Patented Oct. 15, 1918.
4 SHEETS—SHEET 3.
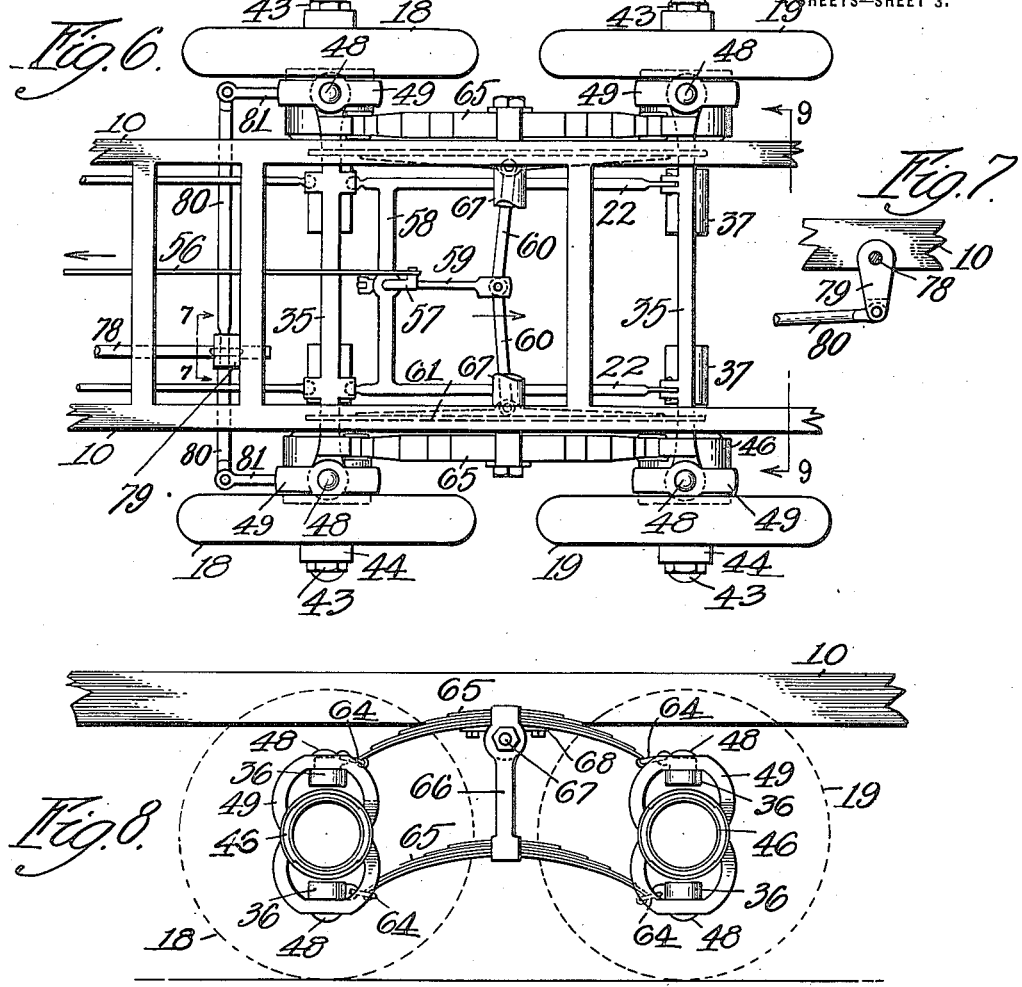
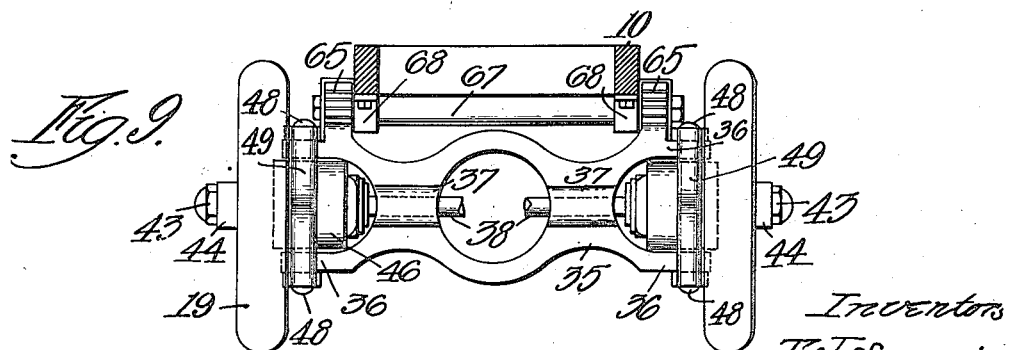

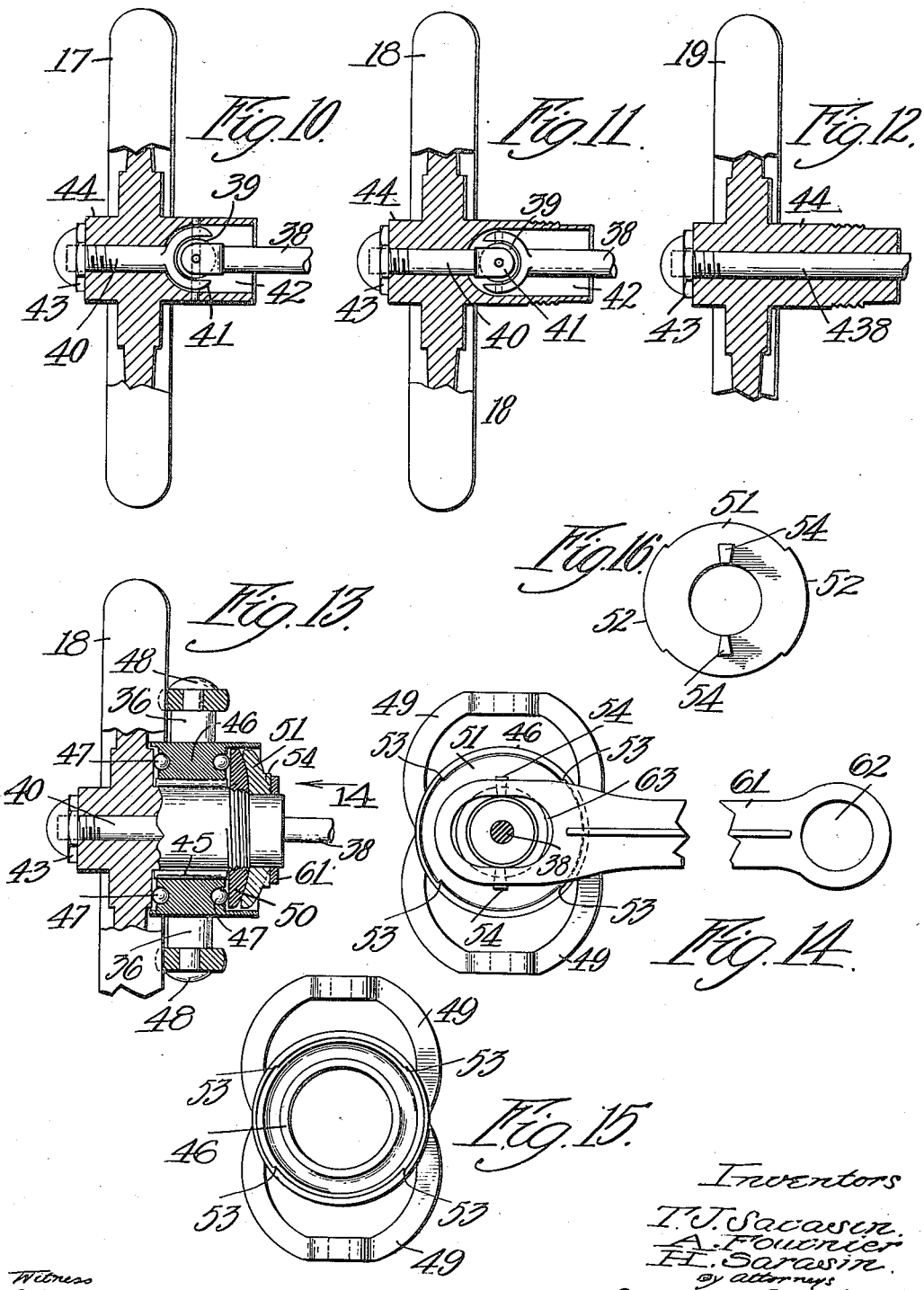

UNITED STATES PATENT OFFICE.

TREFFLY J. SARASIN, AUGUSTE FOURNIER, AND HULDEGE SARASIN, OF FITCHBURG, MASSACHUSETTS, ASSIGNORS OF FIFTY ONE-HUNDREDTHS TO TREFFLY J. SARASIN, EIGHTEEN ONE-HUNDREDTHS TO AUGUSTE FOURNIER, EIGHTEEN ONE-HUNDREDTHS TO HULDEGE SARASIN, AND FOURTEEN ONE-HUNDREDTHS TO ROSELPHY SARASIN, OF FITCHBURG, MASSACHUSETTS.

AUTOMOBILE-TRUCK.

1,281,847.

Specification of Letters Patent. Patented Oct. 15, 1918.

Application filed November 12, 1917. Serial No. 201,455.

*To all whom it may concern:*

Be it known that we, TREFFLY J. SARASIN, AUGUSTE FOURNIER, and HULDEGE SARASIN, all citizens of the United States, all residing at Fitchburg, in the county of Worcester and State of Massachusetts, have invented a new and useful Automobile-Truck, of which the following is a specification.

This invention relates to an automobile truck, and the prinicipal objects thereof are to provide an improved wheel support whereby the weight of the truck and load are carried by a four-wheel construction and the weight of the engine and the operators carried by two wheels only; to provide a construction in which the steering of the front wheels will also cause the forward pair of rear wheels to turn a less degree and thus permit turning in a comparatively small arc; to provide an improved steering gear for this purpose by which the steering wheel has to be turned through a comparatively small arc to turn the truck; to provide a construction of rear truck having four wheels, all power-driven, the rear wheels being mounted on fixed axes while the forward pair of rear wheels are mounted to swing; to connect the chassis with the rear truck in such a way that any change in altitude of the front wheels relative to the rear truck will be prevented from raising any of the rear wheels off the ground or tending to raise them, so that they will have their full driving power at all times independently of their position relative to the front wheels, to connect up the four rear wheels in such a way that if any one of them rises or drops the other three will not be affected in any way, and in fact all four of them will still engage the ground each one at its full driving force; to provide improved connections for securing this flexibility of the wheels with respect to each other; to provide an improved form of wheel frame, one for each pair of wheels, having a place for the differential and adapted to receive the several shafts through them from the ends, said frames being of great strength and of such construction that one of the usual wheel driving shafts can be done away with and improved connections for said frames to constitute an efficient and flexible truck; to provide an improved wheel hub for containing the bearing balls and particularly constructed to receive a hub brake, each one individual to its particular wheel; to arrange these hubs on the swinging wheels in such a way as to provide a vertical axis about which the wheel will turn; to connect the wheel with its driving shaft by a universal joint in line with this axis whereby the shaft will drive the wheel always at full efficiency independently of the angle to which the wheel is swung; to provide improvements in the details of the hubs to secure these advantages; to provide an improved form of brake applicable to all four of the rear wheels simultaneously and mechanism for applying all four brakes at once; to provide improvements in each brake itself by which the brake is made in the form of two cones and its application made efficient and quick-acting; to provide a brake-applying lever preferably reaching from the rear wheel to the other wheel on that side of the rear truck of such a character that it will apply the brake to the forward of these two wheels independently of the position to which the wheel may be swung without loss of efficiency on account of the wheel being turned; to provide an improved form of double spring especially adapted for the wheel frame above mentioned in order to enable the truck to carry a heavy load; and to provide improvements in various details and features of construction for the purpose of advancing these objects, securing a construction capable of use with exceptionally heavy loads, capable of turning quickly and rapidly, and capable of using the full efficiency from the engine for driving purposes under all conditions.

Reference is to be had to the accompanying drawings, in which—

Figure 1 is a side view of the framework and supporting parts of an automobile truck constructed in accordance with this invention;

Fig. 2 is a plan of the same;

Fig. 3 is a plan of a part of the front portion on enlarged scale showing the steering and brake controlling and connecting means;

Fig. 4 is a side elevation of the same with the near wheel removed to show the construction and its connected parts;

Fig. 5 is a transverse sectional view on the line 5—5 of Fig. 3 showing most of the parts thereof in front elevation;

Fig. 6 is a plan of the rear driving truck and connected parts;

Fig. 7 is a sectional view on the line 7—7 of Fig. 6 showing in front elevation a portion of the steering mechanism;

Fig. 8 is a side elevation of the parts shown in Fig. 6;

Fig. 9 is a sectional view on the line 9—9 of Fig. 6, showing most of the parts in rear elevation;

Figs. 10, 11 and 12 are three similar views of the three wheel hubs, the front, middle and rear ones respectively, in central section;

Fig. 13 is a similar view of the hub shown in Fig. 10 with the bearing box and brake shown in section;

Fig. 14 is an elevation of the same viewed from the inner side as indicated by the arrow 14 in Fig. 13 and showing the brake beam;

Fig. 15 is a similar view with the brake, and its operating mechanism removed, and Fig. 16 is a similar view of the movable plate of the brake.

This invention is shown in the form of a motor truck having a chassis 10 with the engine 11 mounted on the front and connected with the transmission 12 near the center by a shaft 13. This transmission is provided with shafts 14 and 15 extending forwardly and rearwardly which connect with the differentials 16, one being shown at the front and two at the rear. In this way the engine drives the front wheels 17 positively and also the two pairs of rear wheels 18 and 19. The details of the engine transmission and differential are not indicated herein as they do not constitute a part of this invention. It is to be observed however, that the main part of the load is supported by the four wheeled truck at the rear, while the front pair of wheels does not have to take much of the load but preferably supports the engine and the operators. In this way if desired the strength and resiliency of the springs supporting the two parts can be materially different so that the engine can be more delicately supported than the load.

The three pairs of wheels 17, 18 and 19 are provided with three frames 35. Each of these frames extends across the truck underneath, and being substantially flat is located in a vertical position. These three frames also, although having some slight differences owing to the fact that connections are made in some cases at the front, some at the rear and some at both sides, yet are designated by the same reference character as they do not differ from each other essentially.

The two rear frames 35 are close together and we consider them as constituting a truck frame which is the main support for the load. The frames 35 are provided with horizontal end arms 36 which project above and below at both ends of the frames, that is at both sides of the truck for connection with the wheels as will be explained. These two rear frames are also connected with each other by four longitudinal rods 22, two on each side, two at the top and two at the bottom, by means of transverse horizontal pivots. This, although not permitting either frame to turn on a horizontal axis materially with respect to the other, does permit either frame to rise or any one of the four wheels to rise or fall independently of the others so as to secure a high degree of flexibility and especially to provide for securing full driving power even when one of the wheels is in a rut or on top of an obstruction. These rear frames are also connected by the springs additionally, as will appear hereinafter.

The front one of the rear frames and the front or steering frame of the machine are also connected. The chassis is provided with two brackets 23 substantially centrally located and with a cross rod 24 connecting them. This rod is pivotally connected with eight rods 25 extending backward and forward from it and pivotally connected at the top and bottom with each of these two frames in the same manner as described above so that the frames are held from a pivotal motion about their own transverse axes, but are capable of up and down motion about the rod 24 as a center, or rather the chassis is capable of moving in that manner, and yet the frames are held in vertical position. This provides for all the desired flexibility in the running gear of the machine.

As has been stated the truck is supported by three pairs of wheels designated 17, 18 and 19. In each case each pair of wheels is connected by a frame 35 which is shown as having an opening therethrough for receiving the differential. Referring to the frame connected with the middle wheels 18 it is to be noted that it has at each end two arms 36, one above and one below provided with means for connecting it with the wheels and that it has at each end midway between these arms a horizontal enlargement 37 constituting a bearing for an axle 38 which is connected with the differential at one end and with the wheel at the other. This shaft in the case indicated and also in the case of the front wheels is provided with a universal joint 39 by which it is connected with the wheel shaft proper 40. This shaft 40 is provided with a yoke 41 which constitutes part of the universal joint and located on the inner side and fits in a socket 42 in the inner side of the hub of the wheel. On the outside this shaft 40 is provided with a nut 43 or other fastening means and therefore is secured directly to the hub 44 of the wheel and is keyed to it so that it is fixed to the wheel so that it must rotate the wheel with it. The exterior cylindrical surface of the hub 44 is provided with roller bearings 45 received in a box 46. This box is provided with opposite side ball races for two sets of bearing balls 47, one set of which is in contact with a preferably flat surface of the wheel itself on one side. On the other side they come into contact with a brake plate 50. In this way it will be seen that the stationary box 46 is connected with the rotating elements by anti-friction bearings of a high degree of efficiency. The ball bearings are protected from dirt by projecting flanges on the box.

In the arrangement shown in Fig. 13 which relates to the second set of wheels this brake plate 50 is screwed on screw-threads formed directly on the hub 44 and can be adjusted to any desired degree so that in this way the wheel is connected with the box 46. This box 46 is provided with a yoke 49 fixedly connected with it and connected with the two arms 36 by central vertical pivot pins 48. These pivot pins are arranged in diametrical alinement with each other and also in exact alinement with the center of the universal joint 39 so that the wheel can turn on that vertical axis without any cramping or reduction in the amount of power transmitted through it.

It is to be understood of course that what has been said applies with the exception of the member 50 to the front wheels and applies with the exception of the universal joint to the rear wheels. In the case of the third set of rear wheels proper there is no universal joint, only one shaft 438 connecting the differential with the wheel because these rear wheels do not have to turn. However, the yoke 49 preferably is used on the rear wheels and connected in the same way, although it is stationary instead of being pivoted by the fact that the shaft 438 is continuous.

The plate 50, as has been described, is used on all four of the rear wheels and is convex or conical on its inner surface, that is the one nearest the center of the machine. There is a coöperating axially movable brake plate 51 having a surface of the same shape adapted to fit the surface of the plate 50. It is mounted within a cylindrical projection on the box 46 so as to be capable of sliding back and forth axially. It is provided with projecting flanges 52 fitting between ridges 53 on the box to prevent it from turning and it is provided with two vertical knife edge bearings 54 on opposite sides of the axle. Thus power can be transmitted to the plate through these knife edges to apply the brake no matter whether the wheels are cramped or straight. The brake is shown as being applied by a brake handle 55 located in convenient position and connected by a rod 56 with a lever 57 supported by the rods 22 of the rear truck which have a cross piece 58 to which the lever is pivoted. This lever is connected by a link 59 with a toggle joint 60, the opposite ends of which are adapted to press outwardly two rigid brake bars 61. These brake bars are of strong construction and provided with a central opening 62 at the rear shaped to fit the extreme end of the hub 44 of each rear wheel. On the front end it is provided with an elongated slot 63 having the same altitude but being sufficiently long and being supported by the hub of the second wheel so that it will allow that wheel to turn. The application of the brakes forces the ends of these brake bars against the knife edges 54 and applies the brakes in an obvious and efficient manner.

The rear truck as has been stated is intended to support the main part of the load and for that purpose it is arranged to have a heavier spring connection with the frame or chassis. For this purpose the arms 36 on both of the rear frames 35 are provided with connections 64 by which they are connected with the ends of leaf springs 65 both at the top and the bottom. These connections 64 are pivoted both to the arms and to the springs so as to give the necessary flexibility and the two springs on the same side are connected together by a rigid vertical bar 66 so that if one spring is stronger than the other the stronger one will take the necessary load and bear the greatest strain.

Another important feature in connection with the general construction of the device lies in the fact that at the tops of these bars 66 the spring structure is connected with the chassis by means of a transverse shaft or rod 67$^a$ which passes freely through a tube 67 which is connected with the chassis by brackets 68 and constitutes a pivotal support for the chassis at this point. Therefore if the front wheels rise or descend it does not cause any cramping of the parts or any additional strain because the frame tips about this pivot. Ordinary springs 69 are used on the front of the machine preferably.

For the purpose of steering the device an ordinary steering wheel 70 is shown on a steering column 71. This steering wheel is provided with a segmental gear 72 meshing with another segmental gear 73 so as to turn it on its center. This gear 73 is provided with an integral arm 74 extending down which is connected by two rods 75 and 76 with arms 77 which are fixedly connected with the two front wheels for turning them.

At the same time the gear 73 is mounted on a longitudinal shaft 78 which extends back along the machine and operates an arm 79 which is fixed to it and which is connected with rods 80 connected with arms 81 similar to the arms 77 for steering the two front wheels 18 of the rear truck. Of course the rod 78 turns with the segment 73 which is secured to it but the length of the arm 79 is shorter than the arm 74 so that the wheels 18 are not turned through as wide an angle as the wheels 17 in steering the truck. This steering arrangement provides for turning it in a very small space and without causing unnecessary side strain on the wheels 18.

From this it will be seen that a four wheel truck construction is provided for supporting the main load while the motor and more delicate parts are supported by a front pair of wheels that preferably are connected with the chassis by lighter spring connections; that the parts are so connected that if any one of the driving wheels, particularly the rear wheels, shall rise or descend the entire frame of the rear truck is sufficiently flexible to permit of this without losing the power because each axle is capable of rising and falling independently of the others, and each side also, the front pair of wheels being pivotally mounted and the connections between the steering frames being flexible. Also that the usual loss of power and strains due to irregular roads are substantially avoided by this construction.

As to the steering arrangement it will be seen that it is of a simple character and provides for turning the forward pair of wheels on the rear truck slightly and the front steering wheels to a greater degree so that the device can be turned in a very small space and also that the turning of the front pair of rear wheels will not affect in any way the application of the brakes thereto with full efficiency. It will be seen also that the brakes are applied simultaneously to the four wheels and if for any reason any one of these brakes fails to work it will not prevent the others from working. The brake itself is an important feature in this art on account of the extreme efficiency of the construction. The construction of the several wheel hubs and the way of connecting the driving axles with them has been described in full and attention is particularly called to the fact that the turning of the wheels cannot under any circumstances result in binding the parts or any loss of power because of the way in which the parts are pivotally connected.

It is to be understood, of course, that we are aware of the fact that modifications can be made in the details of construction and combinations of parts without departing from the scope of the invention as expressed in the claims. Therefore we do not wish to be limited to all the details of construction herein shown and described, but what we do claim is:—

1. In a vehicle, the combination of a truck having a plurality of pairs of wheels, a chassis, a pair of leaf springs on each side, their ends being pivotally connected respectively with the top and bottom of said truck, and means for connecting said springs on the same side at their centers.

2. In a vehicle, the combination of a truck comprising front and middle transverse rigid frames, each having means for connection with a pair of supporting wheels, a chassis, a horizontal pivot rod located transversely on the chassis, and four strut rods on each side pivoted on said rod and pivoted to the top and bottom respectively of the front and middle frames at a distance apart to swing on horizontal axes.

3. In a vehicle, the combination of a rear truck for supporting the main load comprising rear and middle transverse rigid frames pivotally connected together, each having means for connection with a pair of supporting wheels, a two-wheeled front frame for supporting a motor, a chassis supported by said frames, a pivot rod located transversely on the chassis between the front and middle frames, and four strut rods on each side pivoted on said rod and pivoted on horizontal axes to the top and botom respectively of the front and middle frames at a distance apart.

4. In a vehicle, a rear truck for supporting the main load comprising two transverse frames pivotally connected together, each having means for connection with a pair of supporting wheels, in combination with a chassis and a transverse horizontal rod pivotally connected with the chassis, a pair of leaf springs on each side, their ends being pivotally connected respectively with the top and bottom of said frames, and rigid means for connecting said springs on the same side at their centers and with said pivot rod.

5. In a vehicle, the combination of a rear truck for supporting the main load having a plurality of pairs of wheels, a front pair of wheels for supporting a motor, a chassis, a pair of leaf springs on each side, their ends being pivotally connected respectively with the top and bottom of said truck, and rigid means for connecting said springs on the same side at their centers.

6. In a vehicle, the combination of two frames arranged transversely and parallel with each other and connected to constitute a supporting truck, a pair of wheels connected with each frame, each wheel having a hub extending inwardly, a box carried by the end of each frame for receiving said hubs, the two forward boxes being pivoted on vertical central axes, a hub brake mounted in the box of each of the four wheels, means for simultaneously applying all four of said hub brakes independently of the position of the forward wheels, and means for steering the forward wheels out of alinement with the rear wheels, whereby the vehicle can be turned and the brakes applied to all four rear wheels while turning.

7. In a vehicle, the combination of three frames arranged transversely and parallel with each other, two of said frames being near together and being connected to constitute a supporting truck, a pair of wheels connected with each frame, each wheel having a hub extending inwardly, a box carried by the end of each frame for receiving said hubs, the two front boxes and the two middle boxes being pivoted on vertical central axes to the frames, a hub brake mounted in the boxes of each of the four rear wheels, means for simultaneously applying all four of said hub brakes independently of the position of the middle wheels, and means for steering the middle wheels out of alinement with the rear wheels and for simultaneously turning the front wheels through a larger arc.

In testimony whereof we have hereunto affixed our signatures.

TREEFLY J. SARASIN. [L. S.]
AUGUSTE FOURNIER. [L. S.]
HULDEGE SERASIN. [L. S.]